United States Patent

Mikasa et al.

[11] Patent Number: 5,947,455
[45] Date of Patent: Sep. 7, 1999

[54] LIQUID-ENCAPSULATED VIBRATION-PROOF MOUNT DEVICE

[75] Inventors: Tetsuo Mikasa; Yasuo Miyamoto; Atsushi Sakamoto; Shuji Ohtake, all of Wako; Yuichi Ogawa, Ooi-machi; Masato Ichikawa, Ooi-machi; Koji Susa, Ooi-machi, all of Japan

[73] Assignees: Honda Giken Kogyo Kabushiki Kaisha, Tokyo; Yamashita Rubber Kabushiki Kaisha, Saitama, both of Japan

[21] Appl. No.: 08/766,664

[22] Filed: Dec. 4, 1996

[30] Foreign Application Priority Data

Dec. 5, 1995 [JP] Japan .................................. 7-316346

[51] Int. Cl.$^6$ .................................................... F16F 5/00
[52] U.S. Cl. .................................. 267/140.13; 267/220
[58] Field of Search ........................ 267/140.13, 140.12, 267/219, 220, 141.2, 141.3; 248/562, 636

[56] References Cited

U.S. PATENT DOCUMENTS

| 4,610,438 | 9/1986 | Eberhard et al. ............... 267/140.13 X |
| 4,623,135 | 11/1986 | Ray ..................................... 267/140.13 |
| 4,858,596 | 8/1989 | Colford .............................. 267/140.13 |
| 5,080,332 | 1/1992 | Yoda et al. ..................... 267/140.13 X |

FOREIGN PATENT DOCUMENTS

| 1-89644 | 6/1989 | Japan . |
| 1-113646 | 7/1989 | Japan . |

*Primary Examiner*—Lee W. Young
*Attorney, Agent, or Firm*—Nikaido, Marmelstein, Murray & Oram LLP

[57] ABSTRACT

A vibration-proof mount includes an inner shell member comprised of a center pipe and a bush, and an outer shell member including a first collar and a second collar. The center pipe and the outer shell member are connected to each other by first and second elastomer members with a liquid encapsulated therein. A liquid chamber is formed between the first and second elastomer members and expanded and contracted in volume by a load, and an orifice is defined in the first elastomer member and connected to the liquid chamber. The orifice is formed by only a wall surface of the first elastomer member and hence, the sectional area of a flow path in the orifice can be insured to prevent a difference in characteristic between individuals of the vibration-proof mount, as compared with the case where the orifice is defined between a plurality of members.

6 Claims, 15 Drawing Sheets

LIQUID-ENCAPSULATED VIBRATION-PROOF MOUNT DEVICE

BACKGROUND OF THE INVENTION

1. Field of the Invention

The present invention relates to a liquid-encapsulated vibration-proof mount device comprising an inner shell member disposed at a radially inner location of the mount device, an outer shell member disposed at a radially outer location of the mount device, a single or plurality of elastomer members in which a liquid is encapsulated, and an orifice formed in a flow path of the liquid, an outer peripheral surface of the inner shell member and an inner peripheral surface of the outer shell member being interconnected by the elastomer member.

2. Description of the Related Art

Such vibration-proof mount device is already known, for example, from Japanese Utility Mode Application Laid-open Nos.1-89644 and 1-113646.

However, the above known vibration-proof mount device has a problem that the orifice is formed as a gap between the elastomer member and a metal member. For this reason, an error is produced in the flow path sectional area of the orifice depending upon a combined state of the two members and therefore, a difference in characteristics is likely to be produced between individual vibration-proof mount devices.

SUMMARY OF THE INVENTION

Accordingly, it is an object of the present invention to assure the accuracy of the flow path sectional area of the orifice to prevent the difference in characteristic from being produced between the individual vibration-proof mount device.

To achieve the above object, according to the present invention, there is provided a liquid-encapsulated vibration-proof mount device comprising an inner shell member disposed at a radially inner location of the mount device, an outer shell member disposed at a radially outer location of the mount device, a single or plurality of elastomer members in which a liquid is encapsulated, and an orifice formed in a flow path of the liquid, an outer peripheral surface of the inner shell member and an inner peripheral surface of the outer shell member being interconnected by the elastomer member, wherein the orifice is formed by a wall surface of the single elastomer member.

With the above construction, the orifice is formed by the wall surface of the one elastomer member and therefore, as compared with the case where the orifice is formed by a combination of a plurality of members, the accuracy of the flow path sectional area of the orifice can be enhanced to prevent the difference in characteristic from being produced between the individual vibration-proof mount devices.

BRIEF DESCRIPTION OF THE DRAWINGS

The above and other objects, features and advantages of the invention will become apparent from the following description of a preferred embodiment taken in conjunction with the accompanying drawings, wherein.

DETAILED DESCRIPTION OF THE PREFERRED EMBODIMENT

Figure 1:
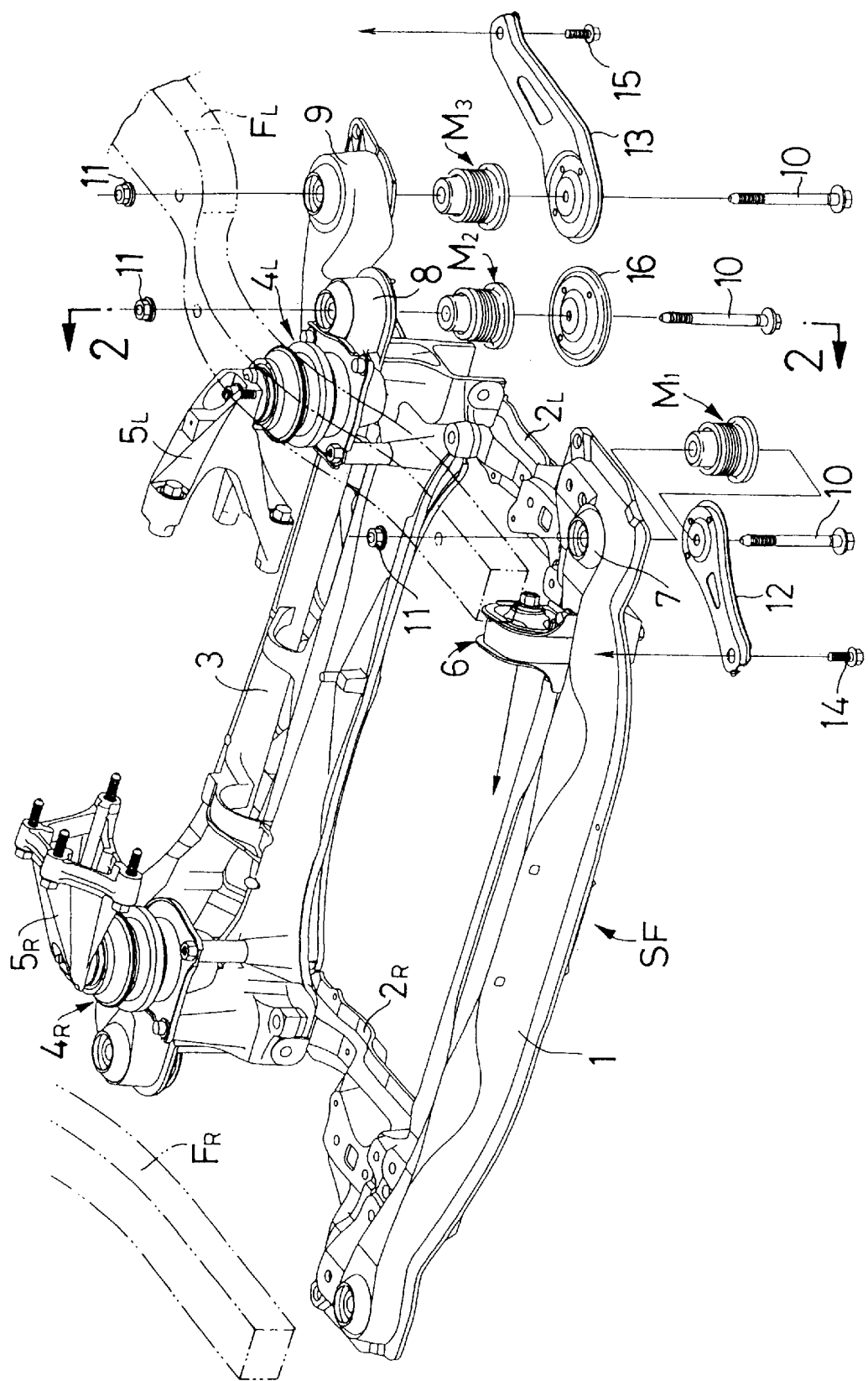
FIG. 1 is a perspective view of a front sub-frame of a vehicle.

Referring to FIG. 1, a front subframe SF of a vehicle is formed into a substantially frame-shape and includes a front beam 1 extending in a lateral direction of a vehicle body, a left side beam $2_L$ and a right side beam $2_R$ extending rearwards from left and right opposite ends of the front beam 1, and a rear beam 3 connecting the left and right side beams $2_L$ and $2_R$ to each other. An engine (not shown) is supported on a left engine mount $4_L$ and a right engine mount $4_R$ at left and right opposite ends of the rear beam 3 through mount brackets $5_L$ and $5_R$ interposed therebetween. The engine is further supported by stoppers 6, 6 (the right stopper 6 is not shown) provided at left and right opposite ends of the front beam 1.

The left side of the front subframe SF is supported on a left side frame $F_L$ by a first vibration-proof mount $M_1$ fitted into a cup-like holder 7 formed at the left end of the front beam 1, and second and third vibration-proof mounts $M_2$ and $M_3$ fitted into two cup-like holders 8 and 9 formed at the left end of the rear beam 3. The first, second and third vibration-proof mounts $M_1$, $M_2$ and $M_3$ and the cup-like holders 7, 8 and 9 are commonly clamped to a lower surface of the left side frame $F_L$ by bolts 10 and nuts 11. At this time, tip ends of plates sandwiched between the first and third vibration-proof mounts $M_1$ and $M_2$ and heads of the bolts 10 are coupled to a vehicle frame (not shown) by bolts 14 and 15, respectively. A washer 16 is clamped between the second vibration-proof mount $M_2$ and a head of the bolt 10.

The right side of the front subframe SF is supported on a right side frame $F_R$ by first, second and third vibration-proof mounts $M_1$, $M_2$ and $M_3$ (not shown) in the same manner as is the above-described left side. All six of the vibration-proof mounts $M_1$, $M_2$ and $M_3$ have the same structure, therefore, only the structure of the second vibration-proof mount $M_2$ as representative of them will be described.

Figure 2:
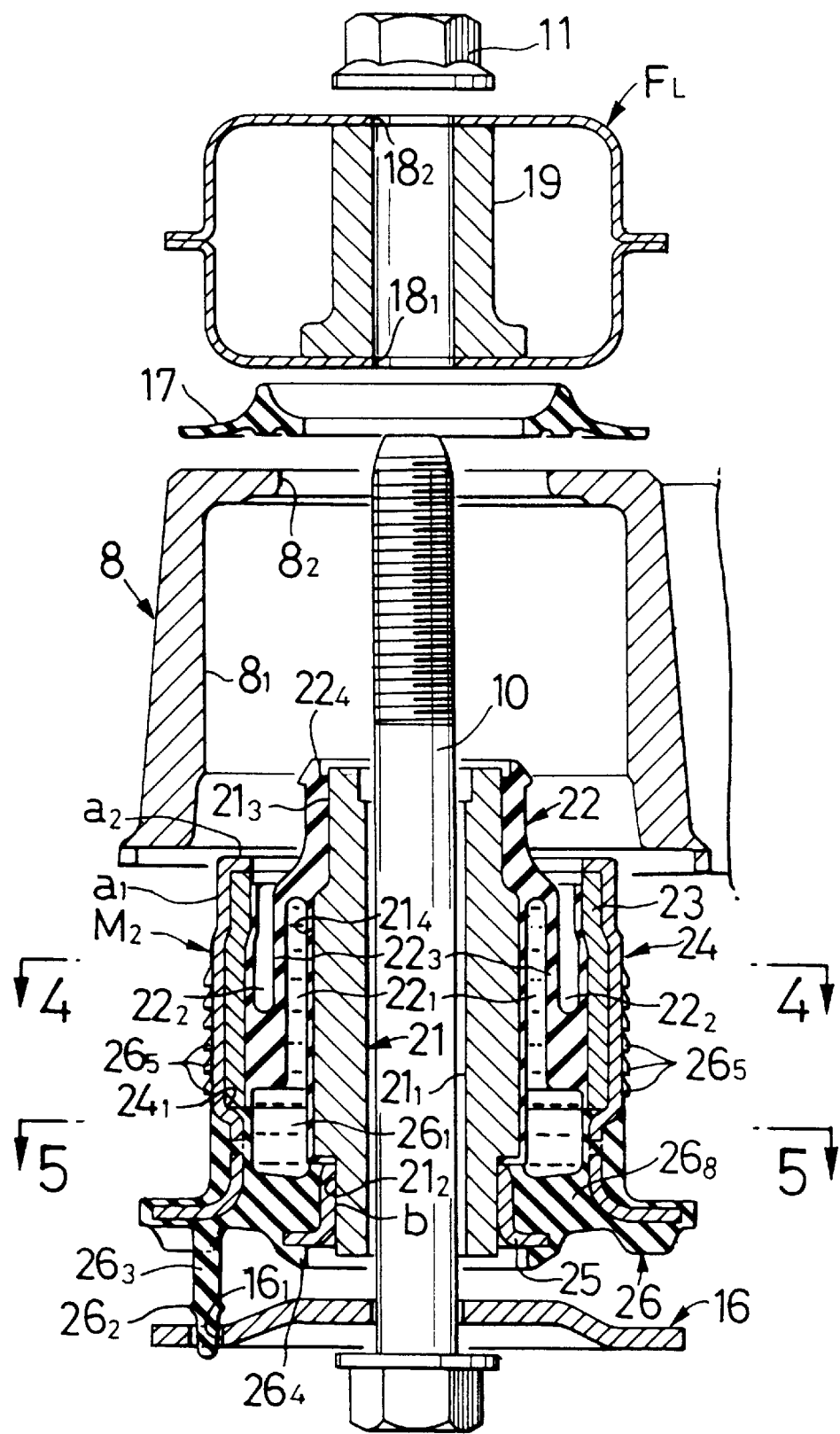
FIG. 2 is an enlarged sectional view taken along the line 2—2 in FIG. 1.

As shown in FIG. 2, the bolt 10 for fixing the vibration-proof mount $M_2$ fitted into an accommodating recess $8_1$ of the cup-like holder 8 with an open lower surface to the left side frame $F_L$ is passed through a washer 16, the vibration-proof mount $M_2$, an opening $8_2$ in the cup-like holder 8, an annular seal rubber 17, a bolt bore $18_1$ in the left side frame $F_L$, a reinforcing collar 19 and a bolt bore $18_2$ in the left side frame $F_L$, and threadedly engaged in the nut 11.

As can be seen from FIGS. 3 to 8, the vibration-proof-mount $M_2$ includes a stepped cylindrical center pipe 21 having a bolt bore $21_1$ through which the bolt 10 is passed. An inner periphery of a first elastomer member 22 made of a rubber is coupled, by baking, to outer peripheries of an upper smaller-diameter portion $21_3$ and a larger-diameter portion $21_4$ of the center pipe 21 excluding a lower smaller-diameter portion $21_2$. A pair of orifices $22_1$, $22_1$ with their lower ends opened and their upper ends closed are axially formed circumferentially with a phase difference of 180° in the first elastomer member 22. A pair of gas chambers $22_2$, $22_2$, with their upper ends opened and their lower ends closed, are axially defined radially outside of the pair of orifices $22_1$, $22_1$. A pair of radially resiliently deformable diaphragms $22_3$, $22_3$ are formed between the orifices $22_1$, $22_1$ and the gas chambers $22_2$, $22_2$. An outer periphery of the first elastomer member 22 is coupled to an inner periphery of the first substantially cylindrical collar 23 by baking.

When the orifice is formed by clearances between a plurality of members, there is a possibility that an error may be produced in sectional areas of a flow path in the orifice due to a number of causes, such as a misalignment of relative positions of these members. However, each orifice $22_1$, $22_1$ is defined by only the wall surface of the single first elastomer member 22. Therefore, there is no possibility of the error produced in sectional area of the flow path due to the misalignment of the relative positions of the members, and it is possible to prevent a difference in characteristic from being produced between individual vibration-proof mount devices $M_2$.

A second elastomer member 26 made of a rubber is insertedly formed so as to connect a lower end of a second substantially cylindrical collar 24 and a bushing 25. An outer periphery of the first collar 23 is fitted to an inner periphery of the second collar 24. The second collar 24 and the first collar 23 are integrally coupled to each other by caulking an upper portion of the second collar 24 inwards, while caulking an upper end downwards (see caulking portions $a_1$ and $a_2$) in a state in which the lower end of the first collar 23 is in abutment against a step $24_1$ of the second collar 24. When the second collar 24 is made, the step $24_1$ can be formed by drawing. An inner periphery of the bushing 25 is integrally coupled to an outer periphery of the lower smaller-diameter portion $21_2$ of the center pipe 21 by press-fitting (see a press-fit portion b).

When the second collar 24 and the first collar 23 have been integrally coupled to each other and the bushing 25 and the center pipe 21 have been integrally coupled to each other in the above manner, the lower end of the first elastomer member 22 and the upper end of the second elastomer member 26 are brought into close contact with each other to define an annular liquid chamber $26_1$ therein. The liquid chamber $26_1$ and the orifice $22_1$ are in communication with each other, and a closed space with a liquid is encapsulated therein is defined by the liquid chamber $26_1$ and the orifice $22_1$. An essential portion of the second elastomer member 26 connecting the lower portion of the second collar 24 and the bushing 25 to each other constitutes a rubber portion $26_8$ which is deformable in a vertical direction. The rubber portion $26_8$ defines a lower wall of the liquid chamber $26_1$.

Different materials having different loss factors are used for the first and second elastomer members 22 and 26. Specifically, a low-damping material having a smaller loss factor (e.g., natural rubber NR) is used for the first elastomer member 22, and a high-damping material having a larger loss factor (e.g., a butyl rubber IIR) is used for the second elastomer member 26.

The center pipe 21 and the bushing 25 constitute an inner shell member of the present invention, and the first collar 23 and the second collar 24 constitute an outer shell member of the present invention.

Three legs $26_3$ each having an annular projection $26_2$ at its intermediate portion are projectingly provided on a lower surface of the second elastomer member 26 and are fitted into three locking bore $16_1$ defined in the collar 16, respectively. When the collar 16 is assembled to the vibration-proof mount $M_2$, the legs $26_3$ are fitted into the locking bore $16_1$ in the collar 16 and prevented from being falling off by the annular projections $26_2$, whereby the vibration-proof mount $M_2$ and the collar 16 can be temporarily assembled, leading to enhanced workability.

Figure 3:
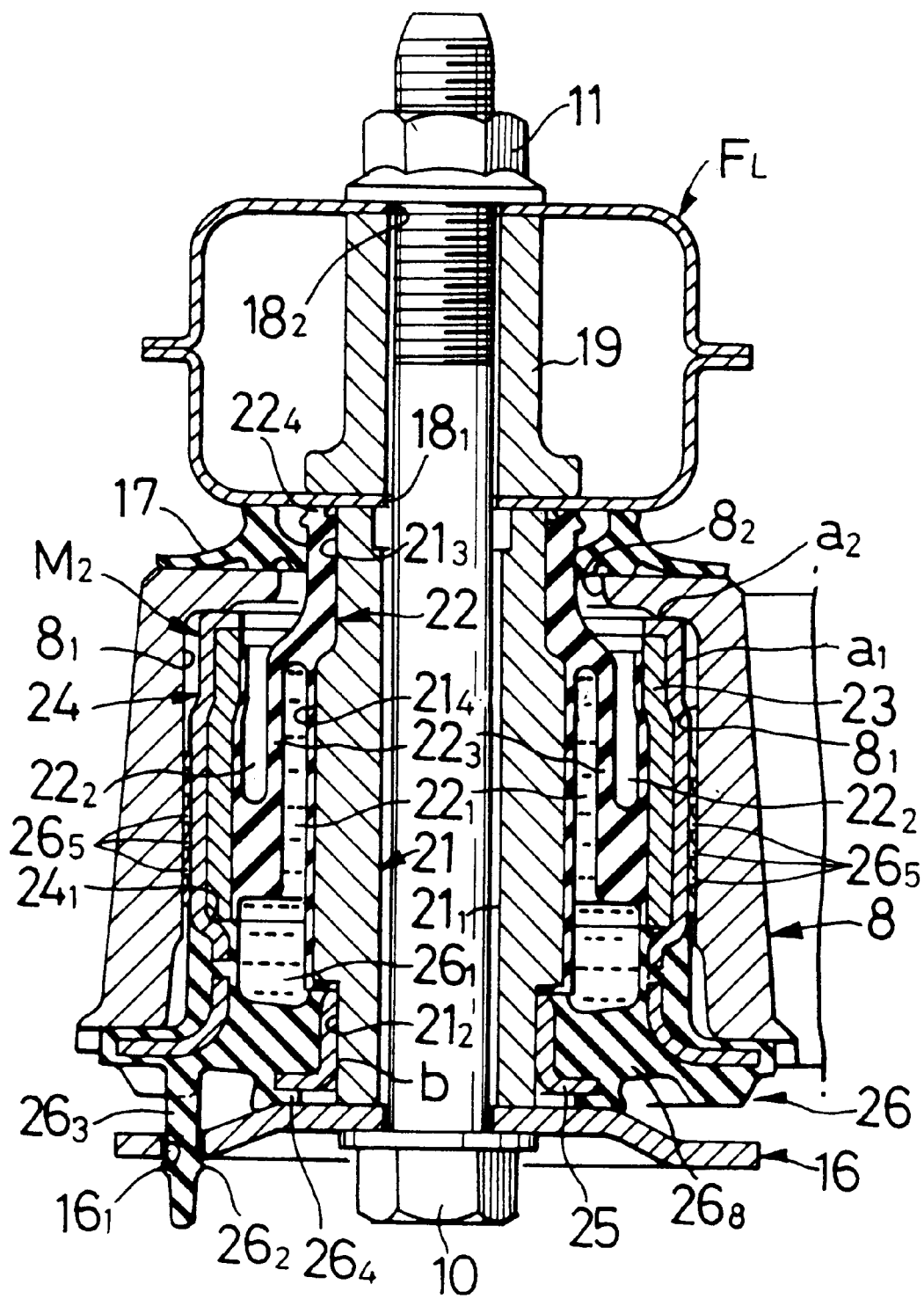
FIG. 3 is a vertical sectional view of a vibration-proof mount.
Figure 4:
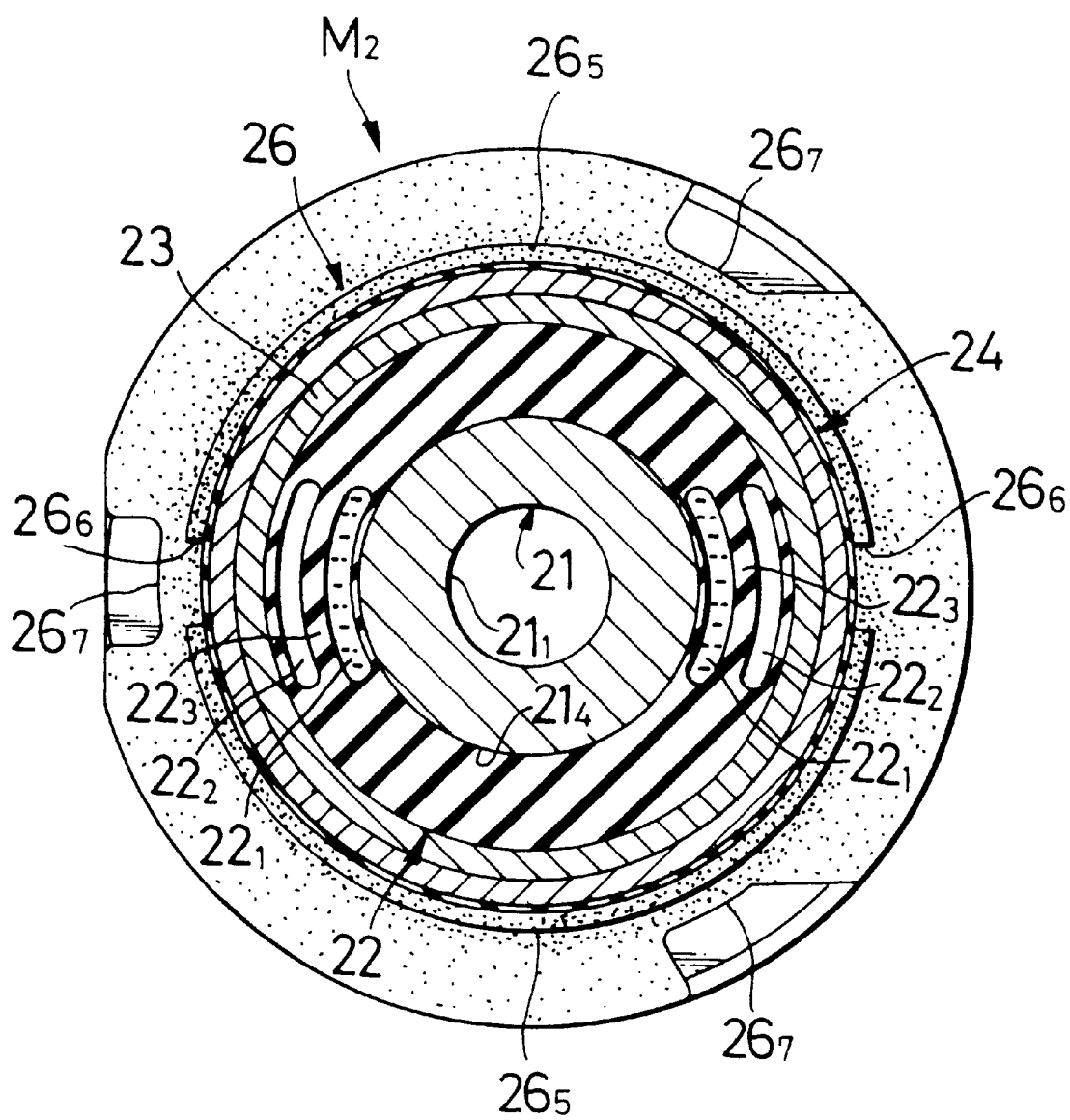
FIG. 4 is a sectional view of the vibration-proof mount taken along the line 4—4 in FIG. 2.
Figure 5:
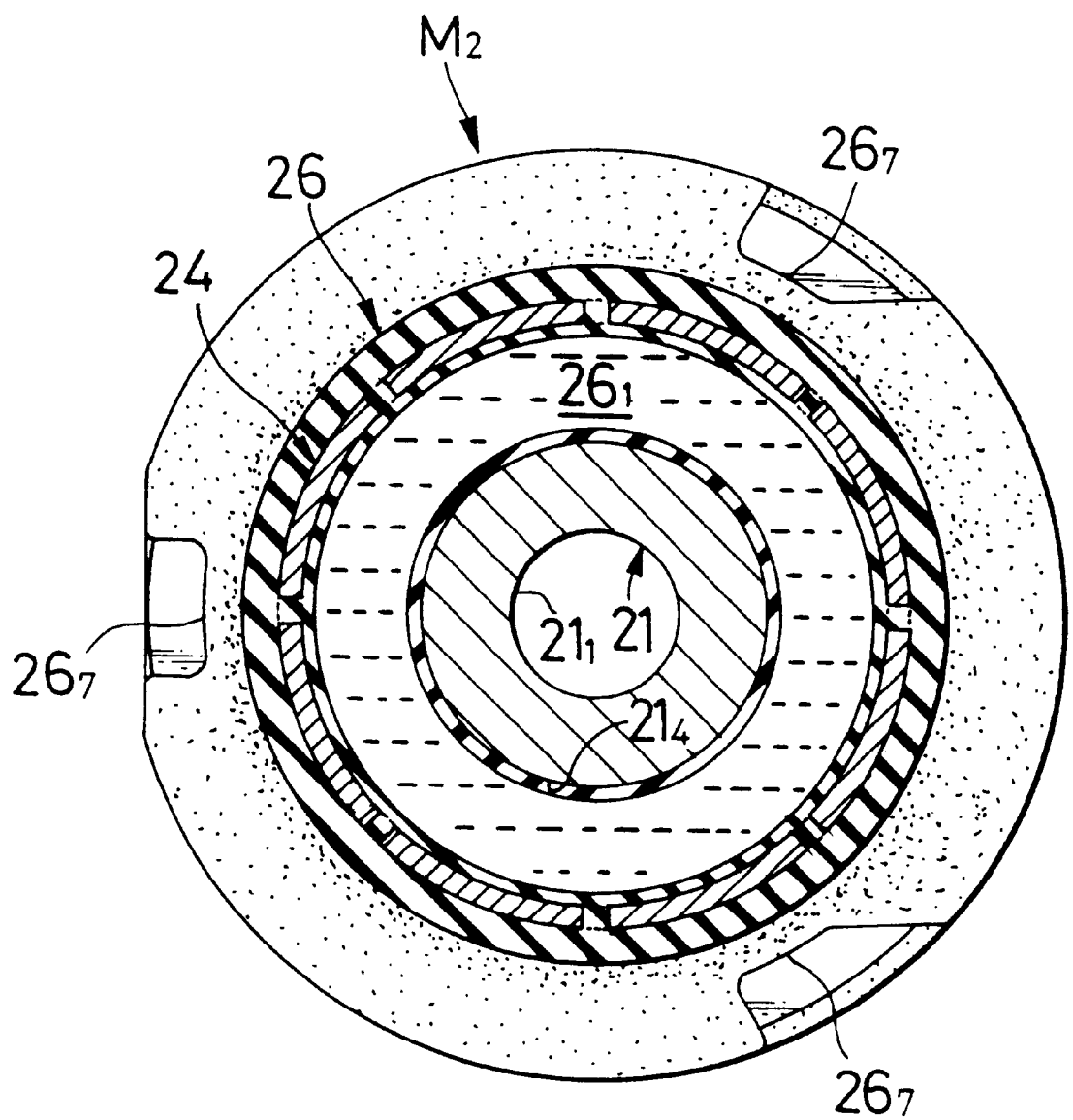
FIG. 5 is a sectional view taken along the line 4—4 in FIG. 2.

As can be seen from a comparison between FIGS. 2 and 3, a seal lip $22_4$ is projectingly provided on the upper end of the first elastomer member 22 to project above the upper end of the center pipe 21, and a seal lip $26_4$ is projectingly provided on the lower end of the second elastomer member 26 to project below the lower end of the center pipe 21. In an assembled state shown in FIG. 3, the seal lip $22_4$ of the first elastomer member 22 resiliently abuts against the lower surface of the left side frame $F_L$ to exhibit a sealing effect, and the seal lip $26_4$ of the second elastomer member 26 resiliently abuts against the upper surface of the washer 16 to exhibit a sealing effect.

Under the sealing effect of the seal lip $22_4$ of the first elastomer member 22 abutting against the lower surface of the left side frame $F_L$ and the sealing effect of the seal lip 264 of the second elastomer member 26 abutting against the upper surface of the washer 16, muddy water or the like is prevented from entering between the bolt bore $21_1$ in the center pipe 21 and the bolt 10 to enhance durability against corrosion, but also the center pipe 21 and the bushing 25 are biased in directions to be press-fitted to each other by reaction forces received by the compressed seal lips $22_4$ and $26_4$ from the left side frame $F_L$ and the washer 16. Therefore, looseness of the press-fit portion b is prevented. Moreover, by the fact that the seal lips $22_4$ and $26_4$ are integrally formed on the first and second elastomer members 22 and 26, a special seal member is not required, leading to a decrease in number of required parts.

Six annular ribs $26_5$ having a triangular sectional shape are projectingly provided on the second elastomer member 26 covering the outer periphery of the second collar 24. The annular ribs $26_5$ are cut away at locations corresponding to the radially outer portion of the gas chambers $22_2$, $22_2$, and two axially extending drain channels $26_6$, $26_6$ are defined in the cut-away portions. The annular ribs $26_5$ have a function to decrease the area of the slide portion of the vibration-proof mount $M_2$ to facilitate the press-fitting operation, when the vibration-proof mount $M_2$ is press-fitted into the accommodating recess $8_1$ in the cup-like holder 8.

Figure 9:
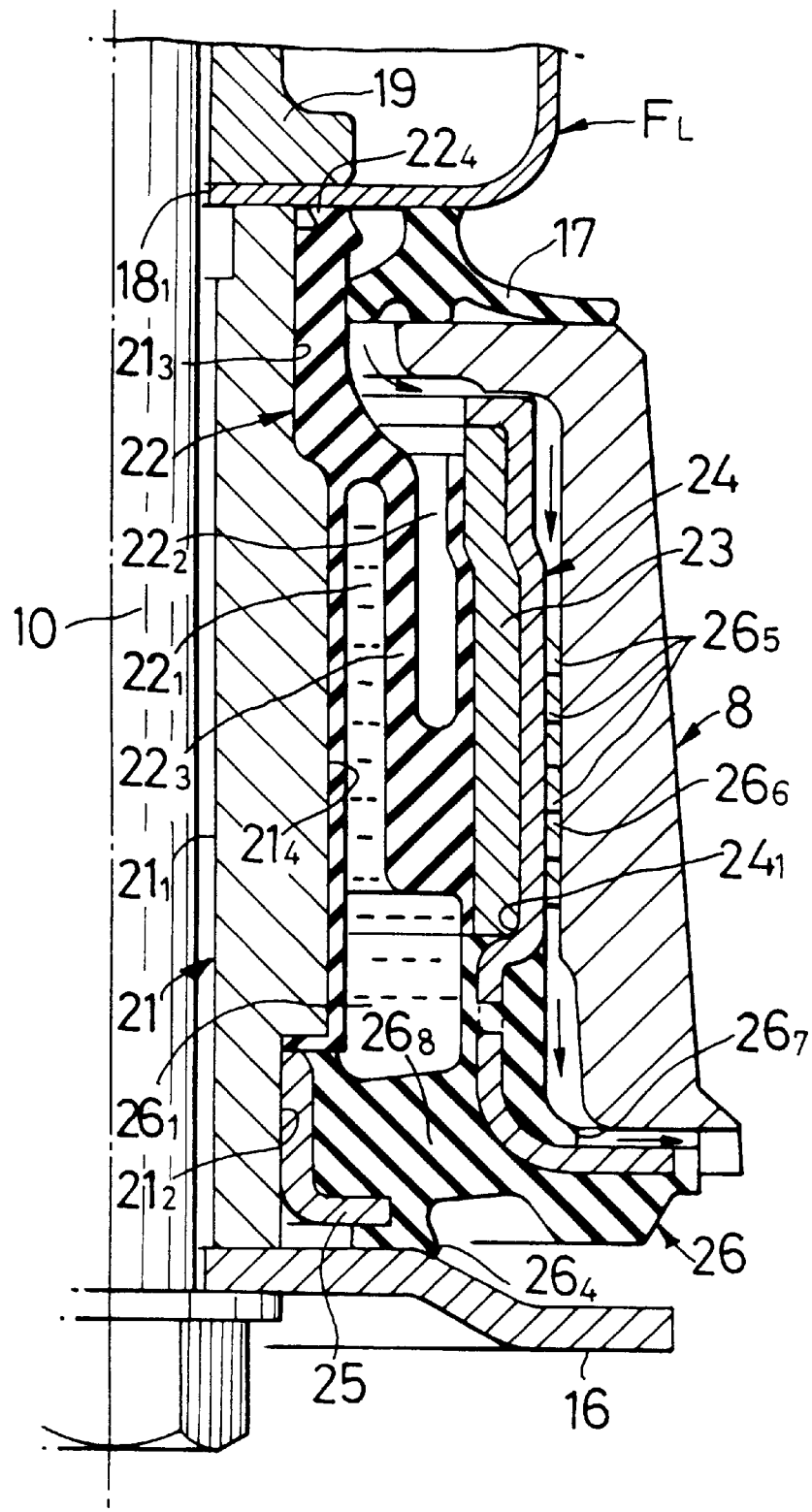
FIG. 9 is a view for explaining a drain passage.

As shown in FIG. 9, even if muddy water or other contaminant passed through the seal rubber 17 or the like enters into between the outer periphery of the second collar 24 and the inner periphery of the cup-like holder 8 for any reason, the muddy water will flow downwards through the drain channels $26_6$, $26_6$ in the annular ribs $26_5$ and is discharged to the outside through three cutouts $26_7$ defined in the upper surface of the lower portion of the second elastomer member 26. This avoids a disadvantage that the muddy water is accumulated between the vibration-proof mount $M_2$ and the cup-like holder 8 to generate a rust.

Steps of assembling the vibration-proof mount $M_2$ will be described below.

Figure 10:
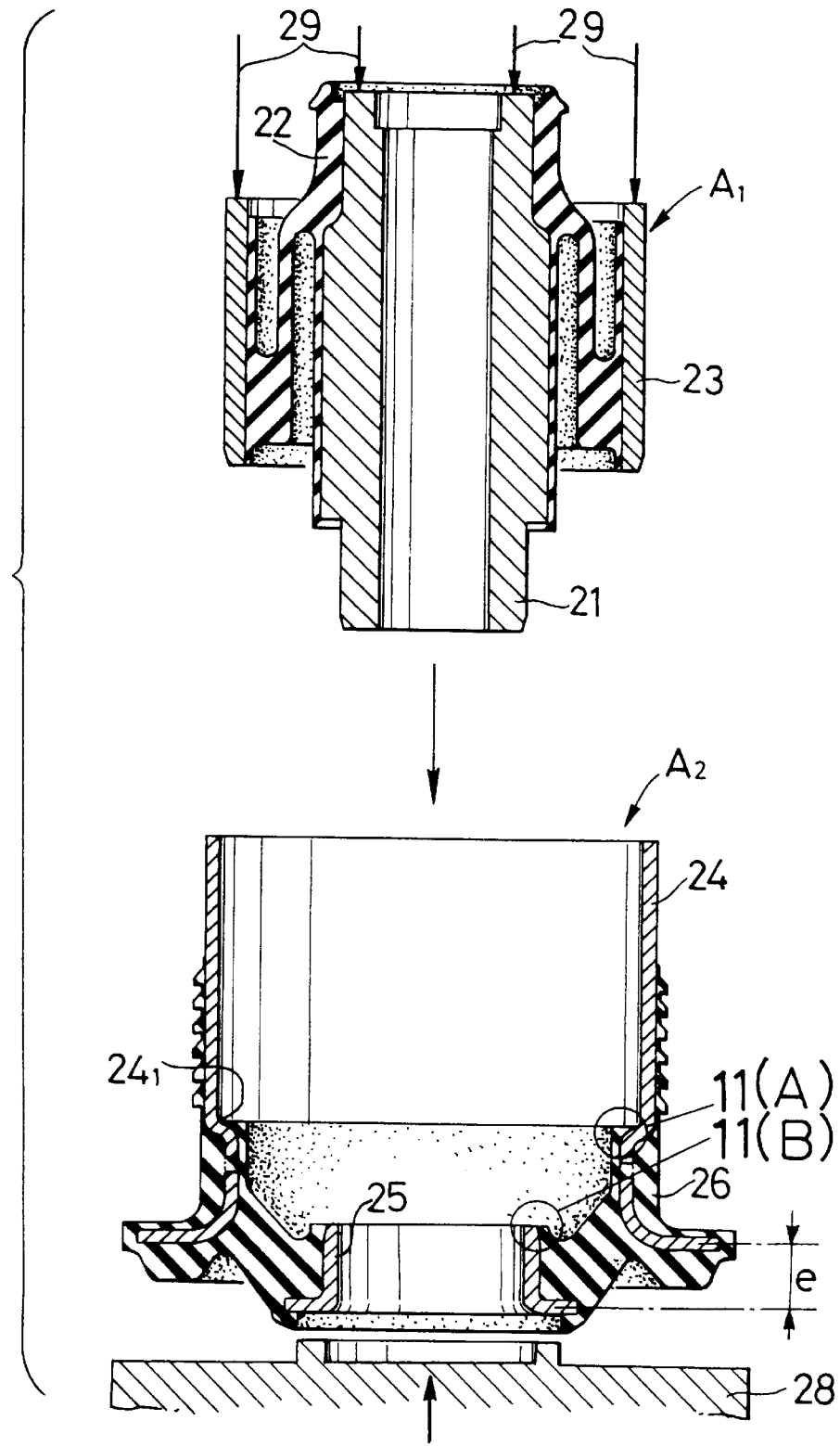
FIG. 10 is a view illustrating a first assembling step.

First, a first subassembly $A_1$ having the center pipe 21, the first elastomer member 22 and the first collar 23 integrally assembled together and a second subassembly $A_2$ having the second collar 24, the second elastomer member 26 and the bushing 25 integrally assembled together are previously assembled to each other, as shown in FIG. 10. In a state in which the lower portion of the second assembly $A_2$ has been fixed by a jig 28, the first subassembly $A_1$ is press-fitted into the second subassembly $A_2$ from above, as shown by arrows 29.

Figure 11A:
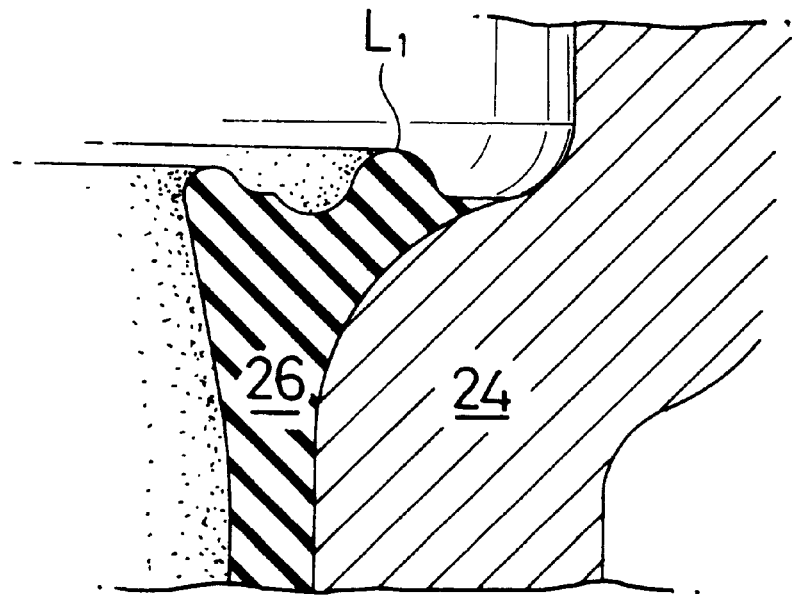
FIGS. 11A and 11B are enlarged views of portions shown by 11A and 11B in FIG. 10.
Figure 11B:
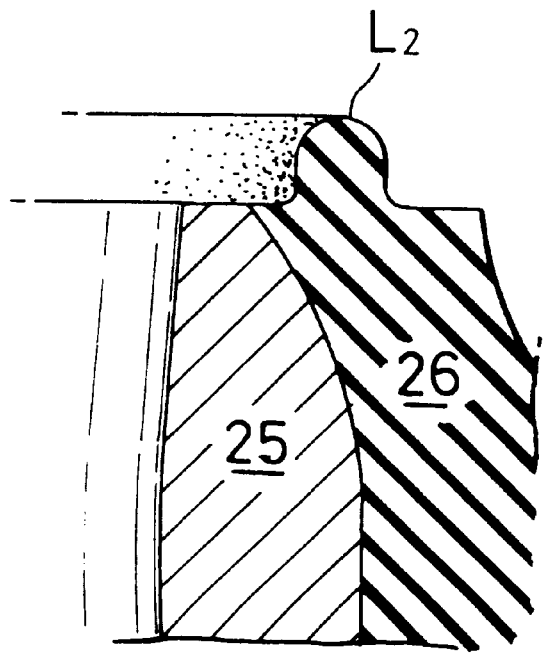
Figure 12:
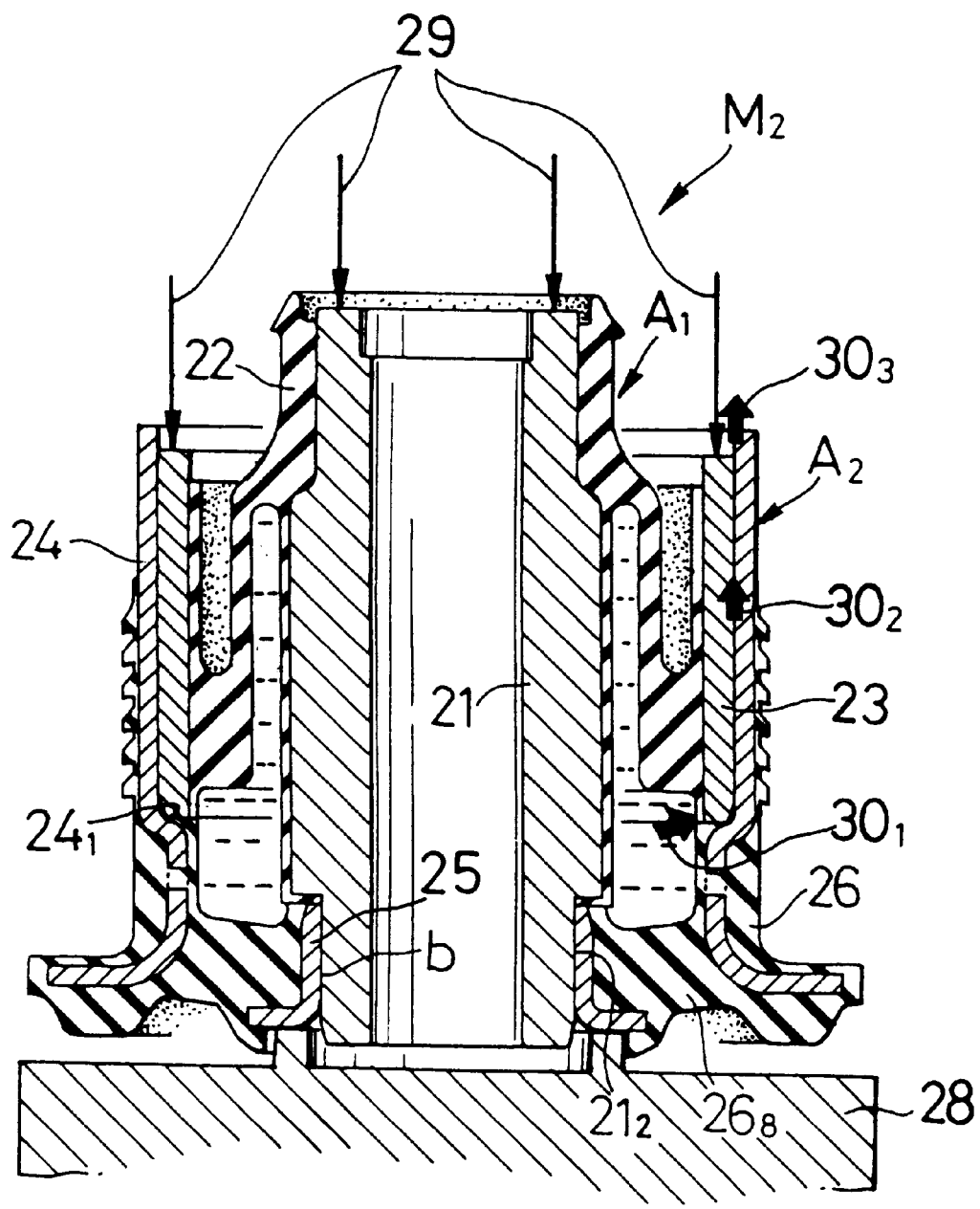
FIG. 12 is a view illustrating a second assembling step.

As can be seen from FIGS. 11A and 11B showing a portion shown by 11A and a portion shown by 11B in FIG. 10 in detail, lips $L_1$ and $L_2$ are projectingly provided on the second elastomer member 26 of the second subassembly $A_2$. The lips $L_1$ and $L_2$ are brought into abutment against the first subassembly A, press-fitted from above to achieve the sealing, so that the liquid inside is prevented from leaking. The step of fitting of the first and second subassemblies $A_1$ and $A_2$ is carried out in the liquid, but before the lip $L_1$ is brought into abutment against the first subassembly $A_1$, an extra portion of the encapsulated liquid is discharged to the outside through a very small gap between the first and second collars 23 and 24 (see arrows $30_1$, $30_2$ and $30_3$ in FIG. 12).

At this time, the positioning of the first and second collars 23 and 24 is performed by abutment of the lower end of the first collar 23 against the step $24_1$ formed in the middle of the second collar 24. The step $24_1$ is simultaneously machined or worked in drawing the substantially cylindrical second collar 24 and hence, a special machining or working step is not required, leading to a decreased machining cost.

Figure 13:
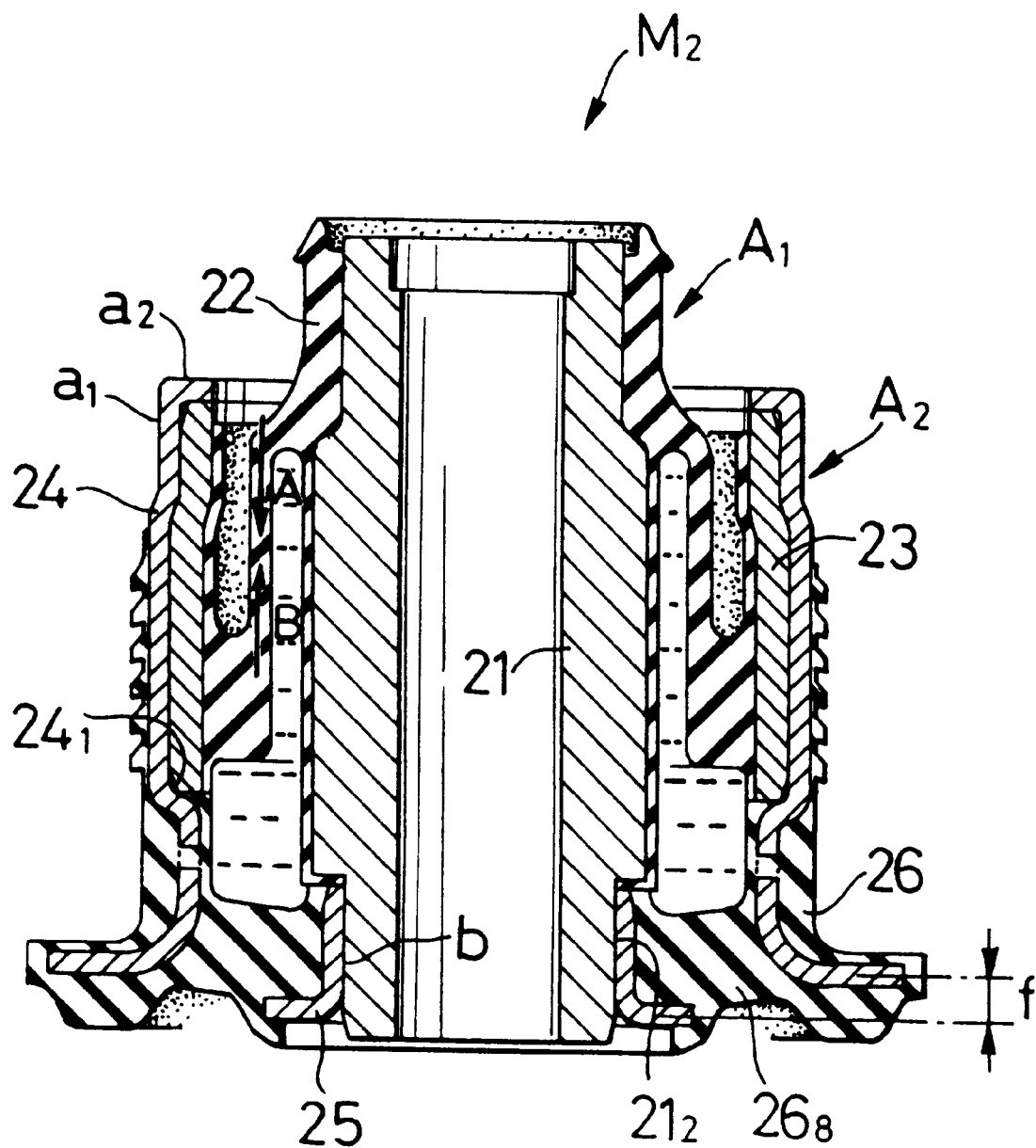
FIG. 13 is a view illustrating a third assembling step.

Then, the first and second collars 23 and 24 are integrally coupled to each other by caulking the upper portion of the second collar 24 at the caulking portion $a_1$ radially inwards and at the caulking portion $a_2$ downwards, as shown in FIG. 13. At this time, there is no possibility that the first and second collars 23 and 24 are misaligned due to a caulking load, because the relative positions of the first and second collars 23 and 24 are reliably defined by the step $24_1$. Thus, it is possible to achieve an easy and precise assembling.

After completion of the fitting of the first and second subassemblies $A_1$ and $A_2$, the upper portion of the bushing 25 is fixed above the lower smaller-diameter portion of $21_2$ of the center pipe 21 and hence, a vertical gap between the second collar 24 and the bushing 25 is shorter than that in a natural state (see character e in FIG. 10). This indicates that the mount $M_2$ has been assembled in a state that a vertical preload has been applied to the rubber portion $26_8$ of the second elastomer member 26. Therefore, the vertical thickness of the rubber portion $26_8$ is increased to increase the spring constant contributing to an increase and decrease in volume of the liquid chamber.

The operation of the vibration-proof mount $M_2$ having the above-described construction will be described below.

A large influence to the characteristic of orifice vibration system of the vibration-proof mount $M_2$ is exerted by springs of the diaphragms $22_3$ and $22_3$ formed on the first elastomer member 22, a spring of the rubber portion $26_8$ formed on the second elastomer member 26 (a spring in expanding and contracting directions of the liquid chamber), and a mass of the liquid within the orifices $22_1$, $22_1$. The first elastomer member 22 constituting the upper wall of the liquid chamber $26_1$ has an extremely large vertical thickness and is difficult to deform. Therefore, what largely contributes to the change in volume of the liquid chamber $26_1$ is the deformation of the rubber portion $26_8$ of the second elastomer member 26 constituting the lower wall of the liquid chamber $26_1$ in the expanding and contracting directions of the liquid chamber. Therefore, the material of the second elastomer member 26 forming the rubber portion $26_8$ is extremely important and thus, by using a high-damping material for the second elastomer member 26, the transmitting force of the vibration-proof mount $M_2$ can be decreased, and the durability of the diaphragms $22_3$, $22_3$ can be enhanced.

Figure 6:
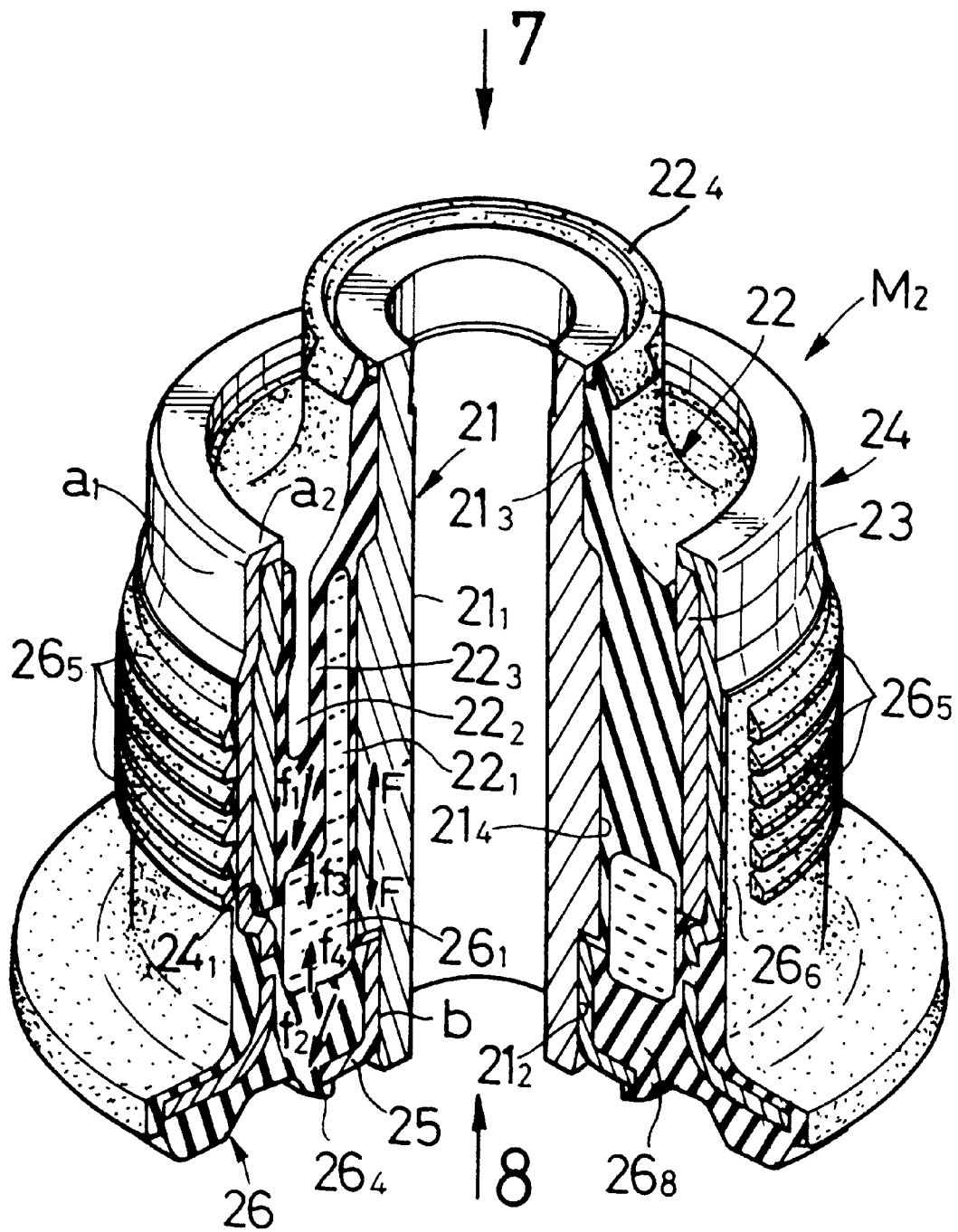
FIG. 6 is a partially broken perspective view of the vibration-proof mount.
Figure 7:
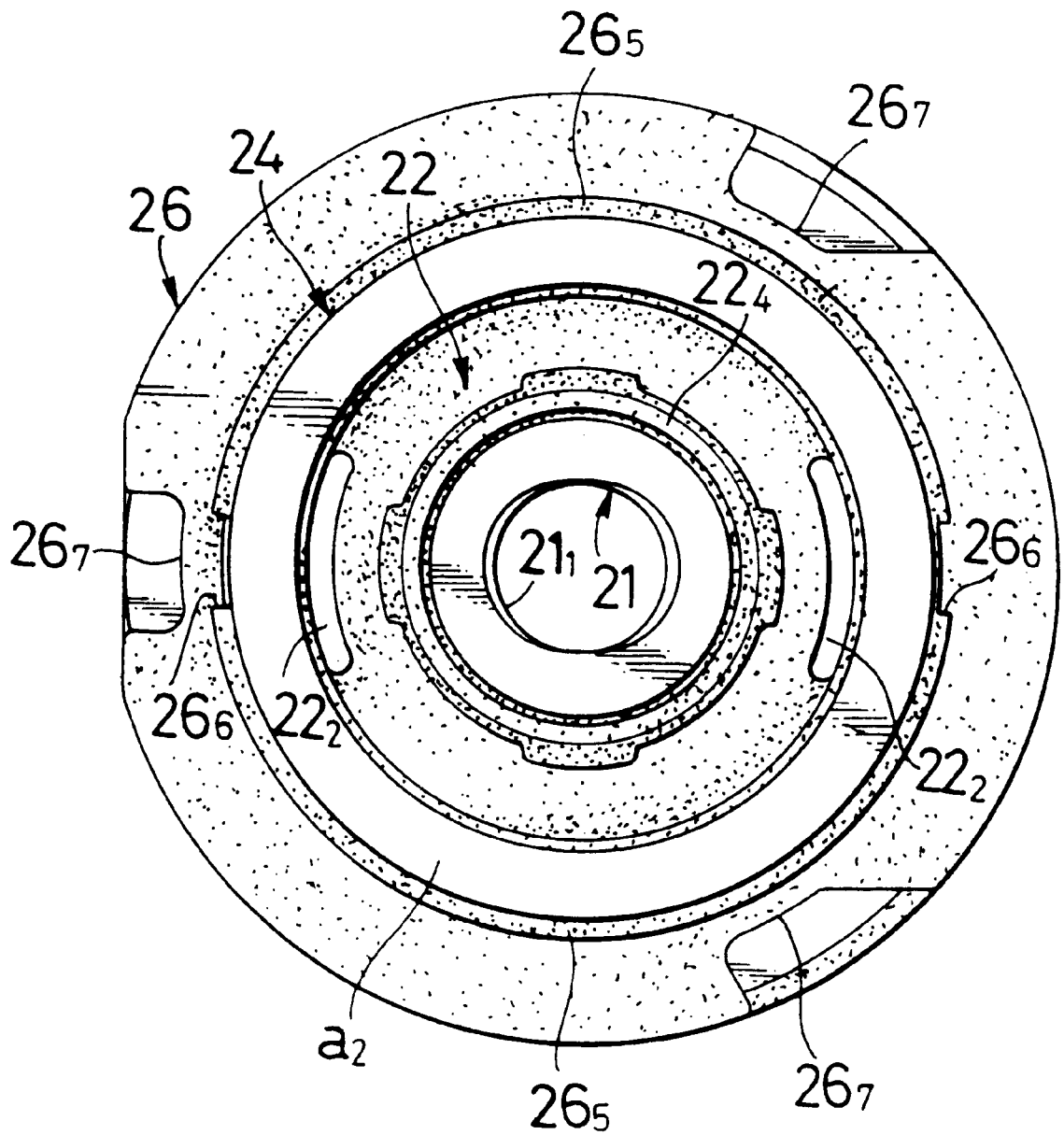
FIG. 7 is a view taken along the arrow 7 in FIG. 6.
Figure 8:
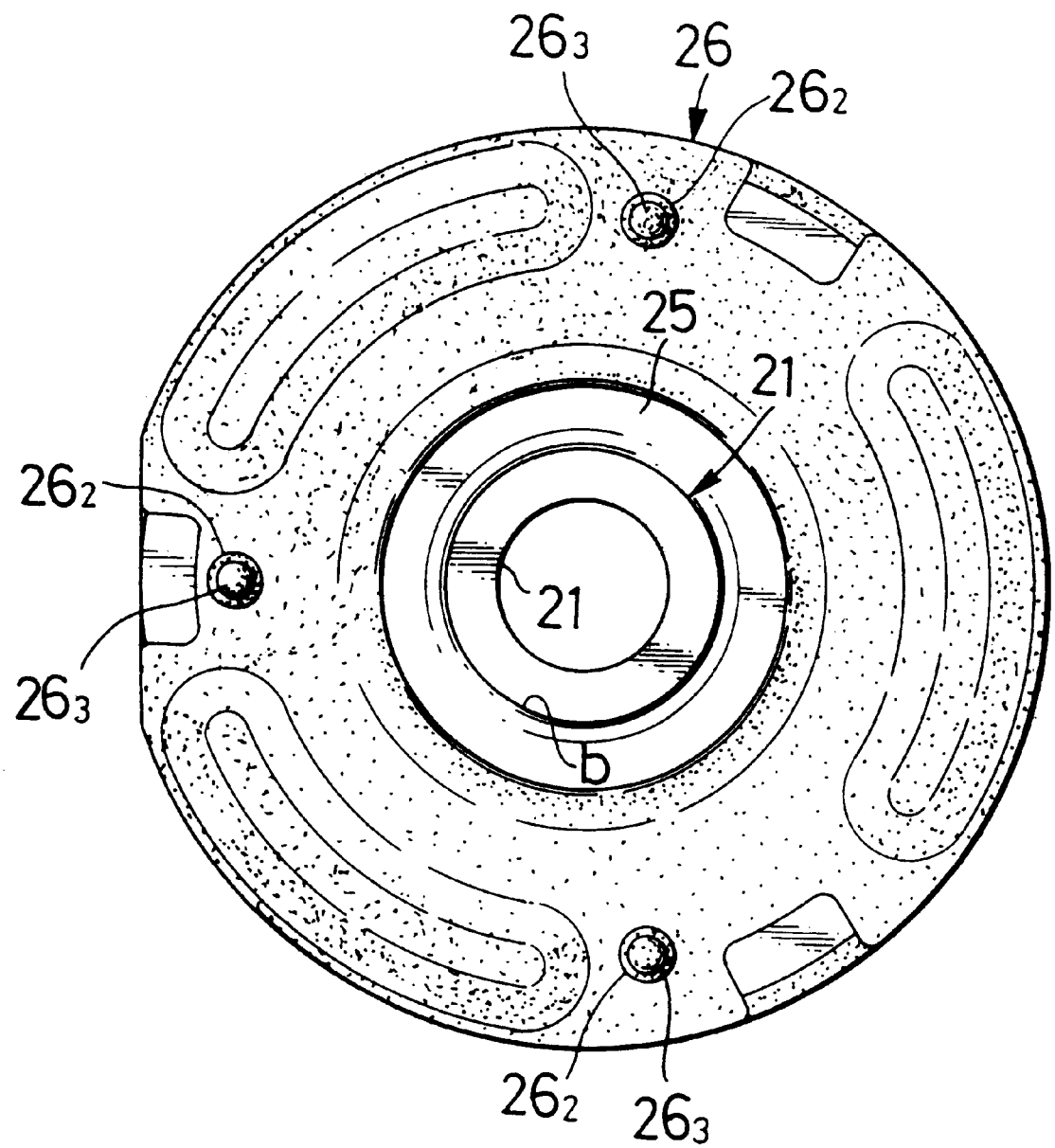
FIG. 8 is a view taken along the arrow 8 in FIG. 6.

This will be described in detail with reference to FIG. 6. When a downward load F is applied to the center pipe 21 of the vibration-proof mount $M_2$ by the relative movement between the sub-frame SF and the left side frame $F_L$, load F is transmitted to the second collar 24 as a load $f_1$ transmitted through the diaphragms $22_3$, $22_3$ and also to the second collar 24 as a load $f_2$ transmitted through the rubber portion $26_8$. As a result, the downward deformation of the rubber portion $26_8$ causes the volume of the liquid chamber $26_1$ to be increased, and when the liquid is moved downwards slightly behind the increase in the volume (i.e., when the input frequency is slightly lower than a resonant frequency), a negative pressure is generated in the liquid chamber $26_1$ to cause loads $f_3$ and $f_4$ to be applied to the upper and lower walls of the liquid chamber $26_1$. Therefore, the upward load $f_4$ acting to eliminate the downward loads $f_1$, $f_2$ and $f_3$ causes the transmission of the load F from the center pipe 21 to the second collar 24 to be reduced.

To effectively generate the negative pressure in the liquid chamber $26_1$, it is desirable that the rubber portion $26_8$ opposed to the liquid chamber $26_1$ is moved without being flexed upwards along with the center pipe 21, rather than being easily flexed upwards. For this purpose, the high-damping material difficult to be deformed by the liquid pressure is used for the second elastomer member 26. Thus, the dynamic spring constant. can be reduced, thereby providing the high-performance vibration-proof mount $M_2$ to which a vibration is difficult to be transmitted.

Figure 14:
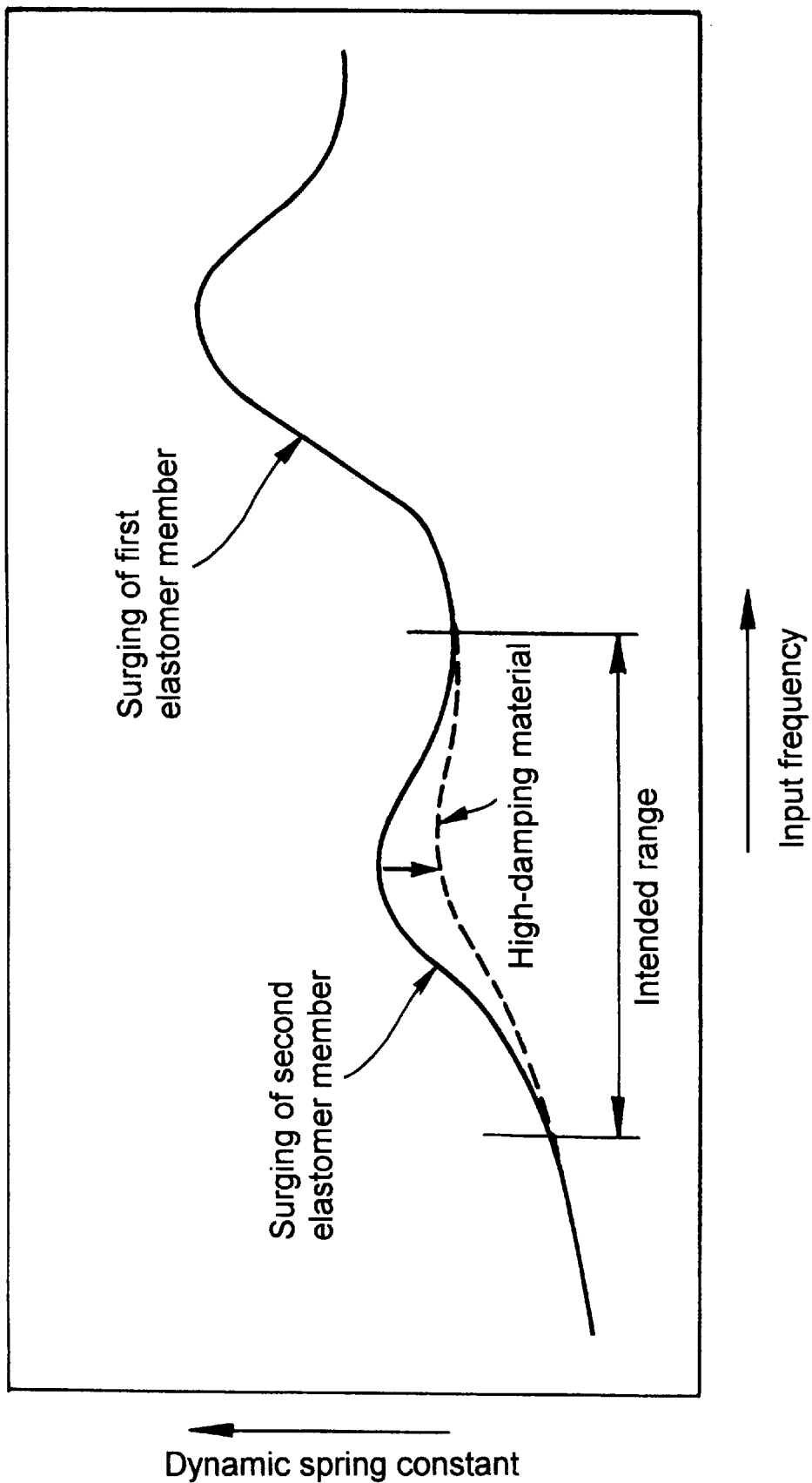
FIG. 14 is a graph illustrating the variation in dynamic spring constant by the compression of a second elastomer member.

Because the shapes of the first and second elastomer members 22 and 26 are different, the first elastomer member 22 causes a surging in a relatively high range of input frequency, and the second elastomer member 26 causes a surging in a relatively low range of input frequency, and the dynamic spring constant is suddenly increased in these ranges, as shown in FIG. 14, resulting in a reduced performance. Therefore, by using the high-damping material for the second elastomer member 26, the deterioration of the dynamic spring constant can be suppressed to the minimum in an intended range of frequency, as shown by a dashed line. Particularly, the surging frequency range for the second elastomer member 26 having the large radial thickness is a range commonly used in a vehicle and hence, the suppression of the deterioration of the dynamic spring constant in such range can contribute to an enhancement in noise-vibration performance.

Although the high-damping material is used for the second elastomer member 26 in this embodiment, this is because the spring constant contributing to the variation in volume of the liquid chamber in the rubber portion $26_8$ is several times larger than the spring constant of the diaphragms $22_3$, $22_3$.

Even when an upward load F' is applied to the center pipe 21 of the vibration-proof mount $M_2$ by the relative movement between the sub-frame SF and the left side frame $F_L$, a positive pressure can be efficiently produced in the liquid chamber $26_1$ to reduce the transmission of the upward load F' by the orifice effect, by the use of the high-damping material difficult to be deformed for the second elastomer member 26.

Further, if a low-damping material easy to be deformed is used for the second elastomer member 26, when the volume of the liquid chamber 26₁ is expanded or contracted, the rubber portion 26₈ forcibly pushes-out, or draws-in the liquid in the orifices 22₁, 22₁ and for this reason, there is a possibility that the amount of deformation of diaphragms 22₃, 22₃ having a smaller thickness is increased to reduce the durability. However, such disadvantage is eliminated by using the high-damping material for the second elastomer member 26.

As described above, by using the different materials having the different loss factors for the first and second elastomer members 22 and 26, the dynamic spring constant in the intended input frequency range can be tuned to any value.

An effect will be described below which is provided by press-fitting of the bushing 25 into the center pipe 21 to increase the spring constant of the rubber portion 26₈ of the second elastomer member 26.

Figure 15:
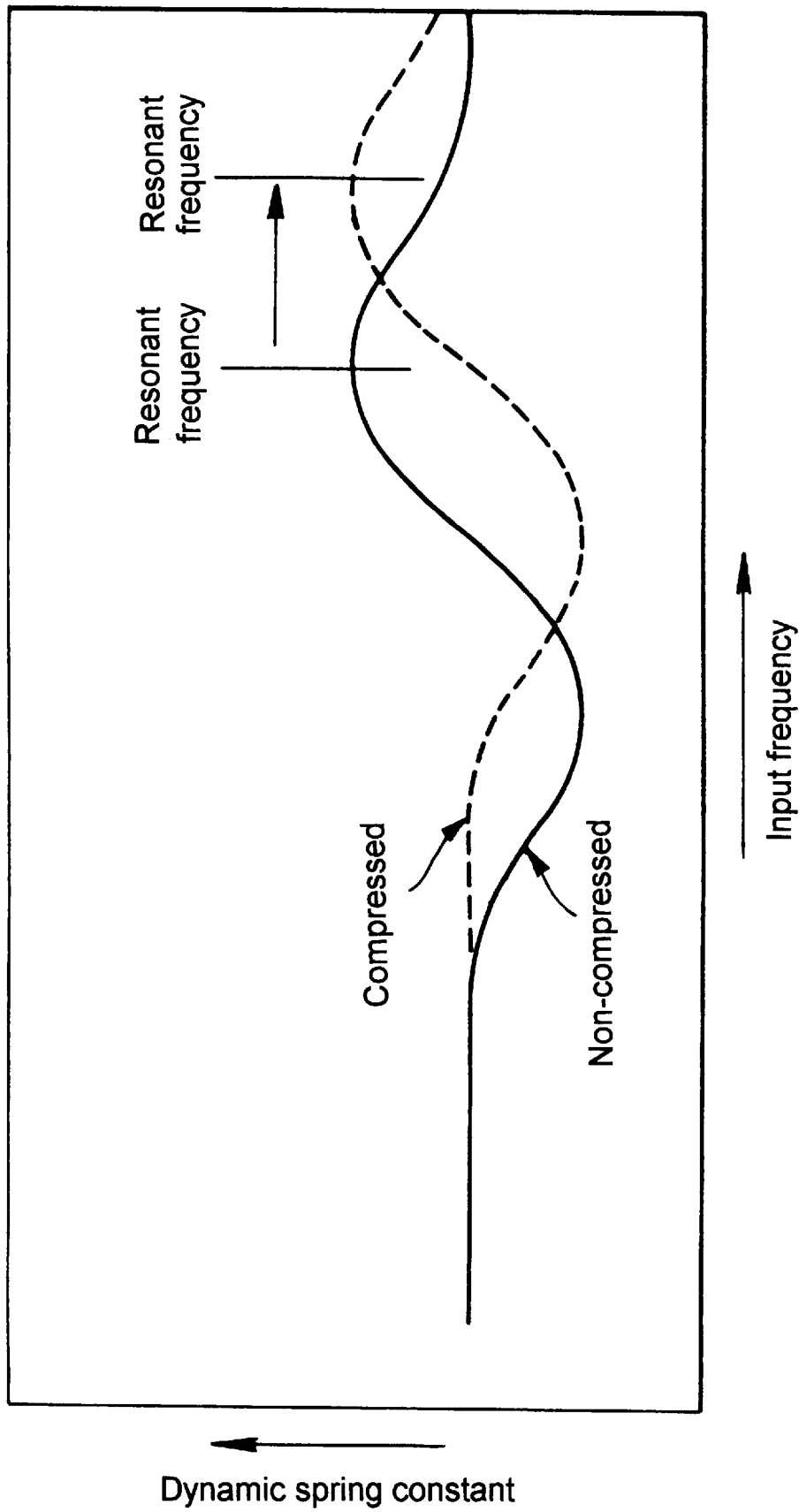
FIG. 15 is a graph illustrating the variation in dynamic spring constant by the use of a high-damping material for the second elastomer.

A resonant frequency f provided by the orifice portions of the vibration-proof mount M₂ is given according to the following equation:

$$f=(1/2\pi)\times(k/m)^{1/2}$$

wherein m represents a mass of the liquid in the orifices 22₁, 22₁, and k represents a total spring constant of the first and second elastomer members 22 and 26 applied to the liquid in the orifices 22₁, 22₁. Therefore, the total spring constant k is increased by an increase in spring constant of the rubber portion 26₈ of the second elastomer member 26 as a result of press-fitting of the bushing 25, causing the resonant frequency f to be shifted toward a value higher than an input frequency range usually used. Therefore, a vibration-proof range in the input frequency range can be widened to enhance the riding comfort (see FIG. 15). Moreover, only by changing the shape of the second elastomer member 26 before being assembled to change the amount of compression of bushing 25 when being press-fitted, the spring constant can be easily regulated, leading to an extremely low cost.

In addition, the center pipe 21 is biased downwards and the first and second collars 23 and 24 are biased upwards, by a resilient force by which the compressed second elastomer 26 is intended to be restore to its free state (see an arrow A and an arrow B in FIG. 13). Therefore, a preload in the compressing direction can be applied to the diaphragms 22₃, 22₃ of the first elastomer member 22. As a result, the maximum amount of diaphragms 22₃, 22₃ elongated when being expanded is suppressed, leading to an enhanced durability of the diaphragms 22₃, 22₃.

Although the embodiment of the present invention has been described in detail, it will be understood that the present invention is not limited to the above-described embodiment, and various modifications in design may be made without departing from the spirit and scope of the invention defined in claims.

For example, the elastomer structure is formed from the two members: the first and second elastomer members 22 and 26 in the embodiment, but it may be formed from a single member or three or more members.

What is claimed is:

1. A liquid-encapsulated vibration-proof mount device comprising an inner shell member disposed at a radially inner location of the mount device, an outer shell member disposed at a radially outer location of the mount device, and first and second elastomer members defining a space therebetween in which a liquid is encapsulated, said space providing a flow path of said liquid and including an orifice formed in said flow path and a liquid chamber communicated with said orifice, an outer peripheral surface of said inner shell member and an inner peripheral surface of said outer shell member being interconnected by said first and second elastomer members, wherein said first elastomer member is coupled at an inner peripheral portion thereof to said outer peripheral surface of said inner shell member and at an outer peripheral portion thereof to said inner peripheral surface of said outer shell member, said first elastomer member having a diaphragm extending substantially axially of said inner and outer shell members with spacings from said inner and outer peripheral portions of the first elastomer member, respectively; and wherein said orifice is formed between said diaphragm and said inner peripheral portion of said first elastomer member.

2. The device according to claim 1, wherein said inner shell member comprises a substantially cylindrical member and a bushing member coupled to one end portion of said substantially cylindrical member, and said outer shell member comprises a first substantially cylindrical collar and a second substantially cylindrical collar, said first and second collars being fixed relative to each other in axial directions thereof, and wherein said first elastomer member is coupled between said first substantially cylindrical collar and said substantially cylindrical member and said second elastomer member is coupled between said second substantially cylindrical collar and said bushing member.

3. The device according to claim 1, wherein a gas chamber is defined between said diaphragm and said outer peripheral portion of said first elastomer member, said gas chamber being connected to the outside of the mount device.

4. The device according to claim 2, wherein a gas chamber is defined between said diaphragm and said outer peripheral portion of said first elastomer member, said gas chamber being connected to the outside of the mount device.

5. The device according to claim 1, wherein said orifice is formed as a pair of orifices arranged in a diametrically opposed fashion around said inner shell member.

6. The device according to claim 2, wherein said orifice is formed as a pair of orifices arranged in a diametrically opposed fashion around said inner shell member.

* * * * *